US011476925B2

(12) United States Patent
Akhavain Mohammadi

(10) Patent No.: US 11,476,925 B2
(45) Date of Patent: Oct. 18, 2022

(54) METHOD AND APPARATUS FOR LIMITED FLOODING IN NETWORKS USING TRANSIT NODES

(71) Applicant: HUAWEI TECHNOLOGIES CO., LTD., Shenzhen (CN)

(72) Inventor: Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 17/167,540

(22) Filed: Feb. 4, 2021

(65) Prior Publication Data
US 2022/0247487 A1    Aug. 4, 2022

(51) Int. Cl.
*H04B 7/185*    (2006.01)

(52) U.S. Cl.
CPC ..... *H04B 7/18582* (2013.01); *H04B 7/18508* (2013.01); *H04B 7/18519* (2013.01); *H04B 7/18521* (2013.01); *H04B 7/18539* (2013.01)

(58) Field of Classification Search
CPC ............ H04B 7/18582; H04B 7/18508; H04B 7/18519; H04B 7/18521; H04B 7/18539
See application file for complete search history.

(56) References Cited

U.S. PATENT DOCUMENTS

| 5,930,348 | A  | 7/1999  | Regnier et al. |
| 6,147,980 | A  | 11/2000 | Yee et al. |
| 6,208,295 | B1 | 3/2001  | Dogan |
| 6,804,199 | B1 | 10/2004 | Kelly et al. |
| 6,816,460 | B1 | 11/2004 | Ahmed et al. |

(Continued)

FOREIGN PATENT DOCUMENTS

| CN | 1681257 A   | 10/2005 |
| CN | 101119372 A | 2/2008  |

(Continued)

OTHER PUBLICATIONS

Edoardo Benzi et al "Optical Inter-Satellite Communication: the Alphasat and Sentinel-1A in-orbit experience"; SpaceOps Conferences, May 16-20, 2016, Daejeon, Korea; 14th International Conference on Space Operations.

(Continued)

*Primary Examiner* — Keith Ferguson

(57) ABSTRACT

A method and apparatus for supporting communication in a network, such as a satellite mesh network. Network nodes maintain network status awareness for a limited region through flooding notifications. Network nodes may route packets by addressing them to other nodes within the limited region. Notifications of events are propagated not only to nearby nodes whose region includes the event location, but also a certain distance beyond such nearby nodes. This assists in propagating the notifications back toward the nearby nodes, in order to increase the likelihood that each network node maintains required awareness even when network failures occur. A node in receipt of an event notification will adjust its awareness when the node is within a first distance of the event. If the node is within a second, greater distance of the event, the node will refrain from adjusting its awareness but will forward the notification to further nodes.

20 Claims, 6 Drawing Sheets

(56) References Cited

U.S. PATENT DOCUMENTS

| | | |
|---|---|---|
| 7,613,121 B2 | 11/2009 | Chou |
| 7,945,272 B2 | 5/2011 | Kim |
| 10,796,251 B2 | 10/2020 | Mason, Jr. et al. |
| 2004/0028060 A1 | 2/2004 | Kang |
| 2005/0152333 A1 | 7/2005 | Smith |
| 2005/0198286 A1 | 9/2005 | Xu |
| 2006/0218225 A1 | 9/2006 | Hee Voon et al. |
| 2007/0147254 A1 | 6/2007 | Larsson |
| 2007/0239349 A1 | 10/2007 | Ohnishi et al. |
| 2009/0046732 A1 | 2/2009 | Pratt, Jr. et al. |
| 2010/0008368 A1 | 1/2010 | Karloff |
| 2012/0014316 A1 | 1/2012 | Rahman |
| 2012/0173527 A1 | 7/2012 | Thiesson |
| 2012/0238235 A1 | 9/2012 | Lee |
| 2013/0036236 A1 | 2/2013 | Morales et al. |
| 2013/0232565 A1 | 9/2013 | O'Connor et al. |
| 2014/0044008 A1 | 2/2014 | Skalecki et al. |
| 2014/0126416 A1 | 5/2014 | Yu et al. |
| 2014/0165163 A1 | 6/2014 | Salkintzis |
| 2014/0177522 A1 | 6/2014 | Marshack |
| 2014/0229405 A1 | 8/2014 | Govrin |
| 2014/0278590 A1 | 9/2014 | Abbassi |
| 2014/0379929 A1 | 12/2014 | Cicic et al. |
| 2016/0057004 A1 | 2/2016 | Ge |
| 2016/0323175 A1 | 11/2016 | Liu |
| 2017/0117978 A1 | 4/2017 | Ko |
| 2017/0239394 A1 | 8/2017 | Fromm et al. |
| 2019/0081884 A1 | 3/2019 | Spohn |
| 2019/0104056 A1 | 4/2019 | Poorrezaei |
| 2019/0356498 A1 | 11/2019 | Hernandez Sanchez et al. |
| 2020/0162335 A1 | 5/2020 | Chen et al. |
| 2020/0382445 A1 | 12/2020 | Calmon |
| 2021/0194808 A1 | 6/2021 | McCormick |
| 2021/0226879 A1 | 7/2021 | Indiresan et al. |
| 2022/0026519 A1 | 1/2022 | Wu et al. |

FOREIGN PATENT DOCUMENTS

| | | | |
|---|---|---|---|
| CN | 102118456 A | 7/2011 | |
| CN | 102752725 A | 10/2012 | |
| CN | 103891352 A | 6/2014 | |
| CN | 103986512 A | 8/2014 | |
| CN | 104579454 A | 4/2015 | |
| CN | 105657777 A | 6/2016 | |
| CN | 107070798 A | 8/2017 | |
| CN | 107231183 A | 10/2017 | |
| CN | 107979409 A | 5/2018 | |
| CN | 108353439 A | 7/2018 | |
| CN | 108390713 A | 8/2018 | |
| CN | 108449774 A | 8/2018 | |
| CN | 108989223 A | 12/2018 | |
| CN | 110505153 A | 11/2019 | |
| CN | 111587580 A | 8/2020 | |
| CN | 112260742 A * | 1/2021 | ......... H04B 7/18582 |
| EP | 2853068 A1 | 4/2015 | |
| WO | 2016069077 A1 | 5/2016 | |
| WO | 2019173127 A1 | 9/2019 | |
| WO | 2020113214 A1 | 6/2020 | |
| WO | 2020193445 A1 | 10/2020 | |

OTHER PUBLICATIONS

Hemani Kaushal et al "Optical Communication in Space: Challenges and Mitigation Techniques"; Citation information: DOI 10.1109/COMST.2016.2603518, IEEE Communications Surveys & Tutorials.

M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.

Zengyin Yang et al "Modeling and Routing for Predictable Dynamic Networks"; arXiv.org > cs > arXiv:1704.00885; Aug. 17, 2018.

"Iridium NEXT: A Global Effort to Launch the Future of Global Communications"; Apr. 19, 2013 | Featured Stories, Iridum NEXT.

Sahhaf et al. Scalable and energy-efficient Optical Tree-based Greedy Router, 2013 15th International Conference on Transparent Optical Networks (ICTON) ,Sep. 19, 2013, 5 pages.

Akhavain Mohammadi, Mehdi Arashmid U.S. Appl. No. 17/140,668, filed Jan. 4, 201.

Akhavain Mohammadi, Mehdi Arashmid U.S. Appl. No. 17/140,668, filed Jan. 4, 2021.

Ericsson Latency analysis of SCell BFR solutions 3GPPTSG-RAN }VGI Meeting #97, R1-1907438 May 17, 2019 (May 17, 2019), 4 pages.

"Iridium Next: A Global Effort to Launch the Future of Global Communications"; Apr. 19, 2013 | Featured Stories, Iridium Next.

Hueseyin Uzunalioglu et al "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave., Ste. 600, Washington, D.C., District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference an Transparent Optical Networks (ICTON) ,Sep. 19, 2013, 5 pages.

McCormick, William Carson et al. U.S. Appl. No. 16/721,171, filed Dec. 19, 2019.

Halabian, Hassan et al. U.S. Appl. No. 16/888,023, filed May 29, 2020.

Ashwood-Smith, Peter et al. U.S. Appl. No. 16/887,675, filed May 29, 2020.

McCormick, William Carson U.S. Appl. No. 16/882,952, filed May 26, 2020.

Akhavain Mohammadi, Mehdi Arashmid et al. U.S. Appl. No. 17/141,824, filed Jan. 5, 2021.

Akhavain Mohammadi, Mehdi Arashmid U.S. Appl. No. 17/140,668, filed January 4, 201.

Akhavain Mohammadi, Mehdi Arashmid U.S. Appl. No. 17/117,333, filed Dec. 10, 2020.

* cited by examiner

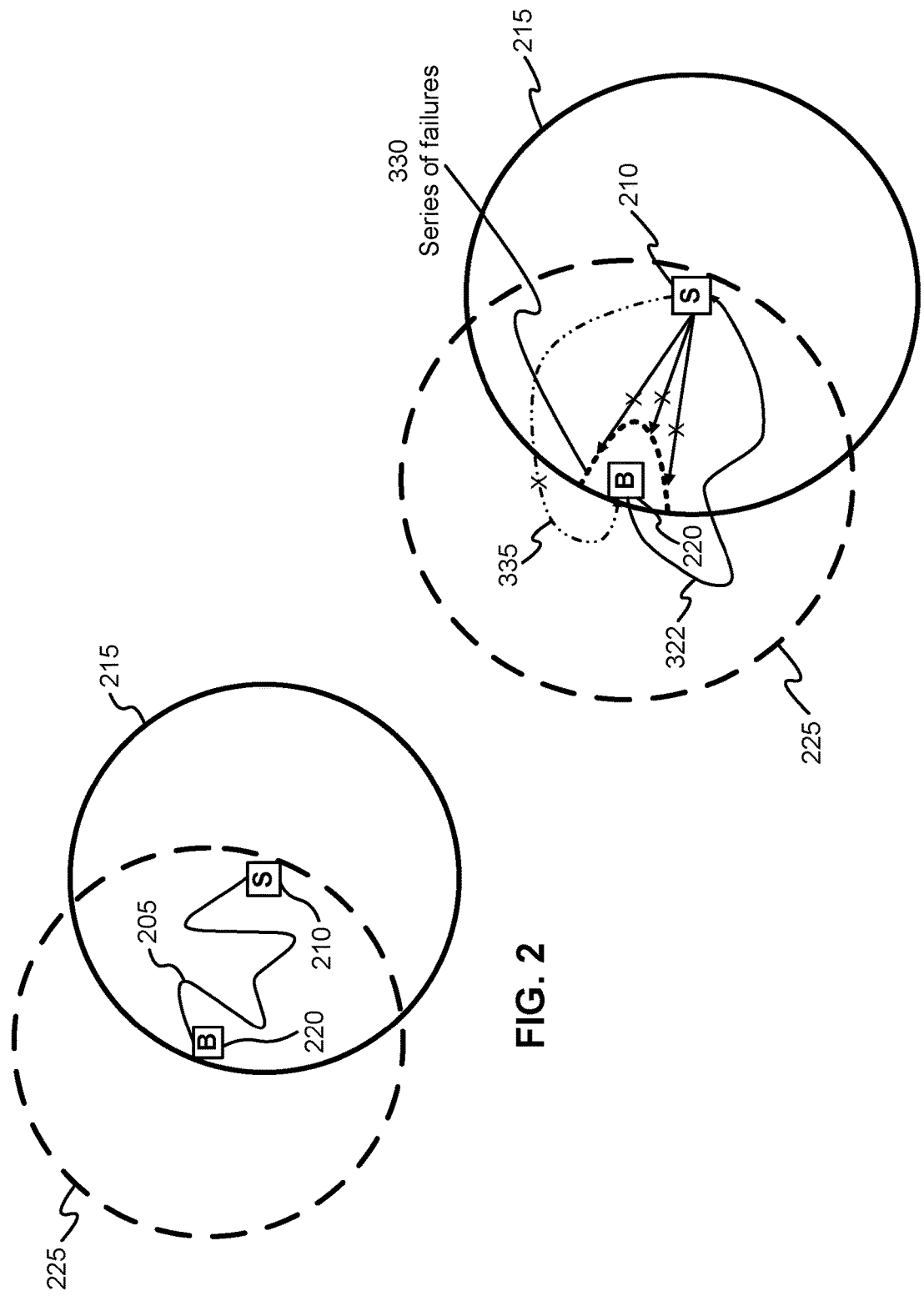

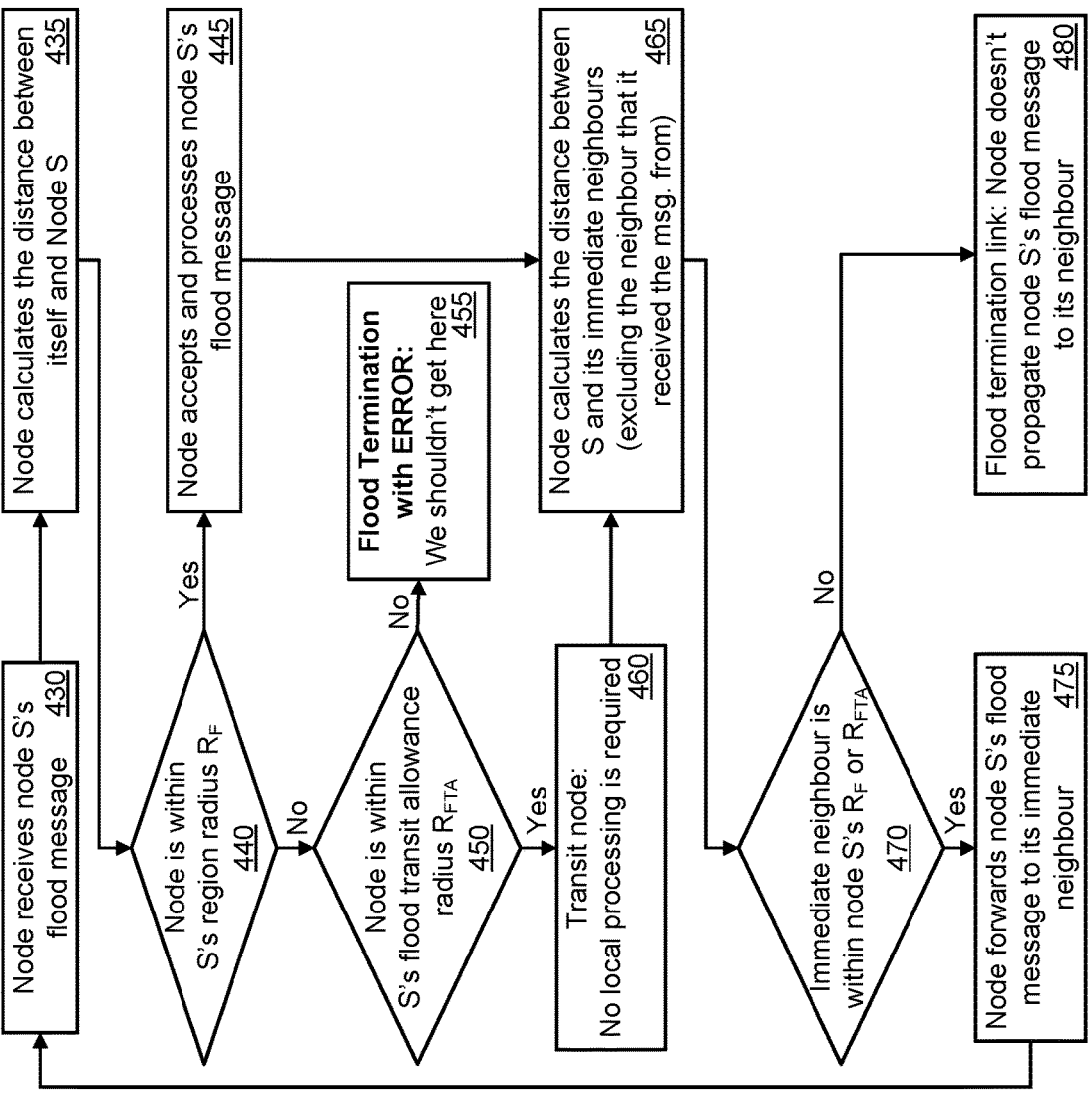
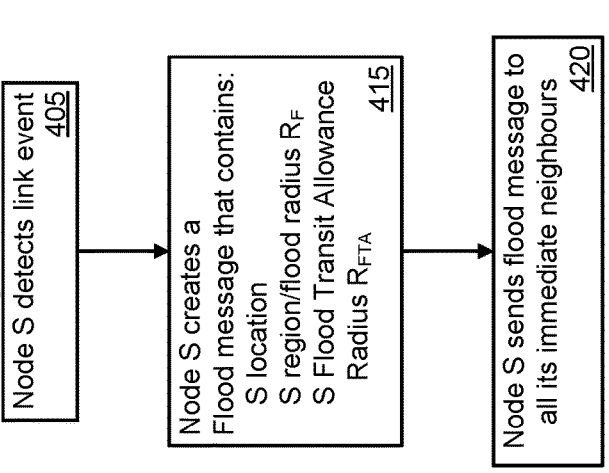
FIG. 4A
FIG. 4B

METHOD AND APPARATUS FOR LIMITED FLOODING IN NETWORKS USING TRANSIT NODES

CROSS-REFERENCE TO RELATED APPLICATIONS

This is the first application filed for the present invention.

FIELD OF THE INVENTION

The present invention pertains to packet-based data networks, such as satellite mesh networks, and in particular to a method and apparatus for communicating network status updates in such networks where the set of nodes toward which a given node can transmit data packets is limited.

BACKGROUND

Low earth orbit (LEO) satellite constellations are being developed to provide, among other things, Internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. Use of LEO satellite systems generally leads to lower latency than medium earth orbit or geostationary orbit systems, but requires large numbers of satellites.

Data packets can be routed through a satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

More generally, mobile ad-hoc networks involving rapidly or frequently moving network nodes can be created in which peer-to-peer network connections are subject to significant and rapid change over time. The nodes can be associated, for example, with cars, portable mobile base stations, balloons, drones, satellites, or a combination thereof. The network movement may extend across large geographical areas. Such networks can be referred to as having hyper dynamic network topologies. In such networks, it is challenging to maintain awareness of the current and future available network connections, and thus network routing is problematic. Even if network connections can be predicted, propagating notifications of network events such as link failures can be costly in terms of resource usage, and can be difficult to perform in a timely manner.

Therefore, there is a need for a method and apparatus for supporting communication and network status updating in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for communicating network status updates between network nodes. This may be performed in support of networking solutions in which a given node in a network is only aware of network status in a limited region of the network, and transmits data packets only toward other nodes within this limited region. If necessary, these other nodes can forward the packets onward toward a final destination node. To reliably provide a network node with network status information for the limited region, propagation and handling of network status update messages is configured in a particular manner as described below.

Embodiments of the present invention may be applied in networks utilizing orthodromic or piecewise shortest path first routing schemes. Embodiments of the present invention may be used in particular where network nodes have limited information about the network, and make packet routing decisions based on this limited information. For example, each network node may be configured to receive network status update messages only for network events within a limited region around that network node. The network node can route packets to another node within that limited region, in such a manner that the packet is thereby routed closer to its destination.

According to some embodiments, network nodes are configured such that the regions in which network status update messages are propagated are larger than (e.g. encompass or surround) the limited regions within which network status awareness is maintained and packets are routed. Nodes can cause network status update messages to propagate through these larger regions, but still process only those network status update messages that are relevant for their limited regions. Accordingly, the limited region within which a node routes packets is more likely, and possibly guaranteed, to match or fall within the limited region for which the node is expected to have up-to-date network status information. To this end, transit nodes are provided which forward, but do not necessarily process, network status update messages (also referred to as notifications of events). The transit nodes can assist in propagating the messages around network failures and back to nodes which rely on the contents of these messages.

Embodiments of the present invention provide a method for supporting communication by a first node in a network. The method includes maintaining a network status for a limited region of the network which is communicatively coupled to the first node. The network status includes availability of communication links between network nodes in the limited region. The method further includes receiving a notification of an event corresponding to another node of the network or corresponding to a communication link of the network. The method further includes, when the first node is within a first distance of an origin point of the event, adjusting the network status for the limited region based on the event, and when the first node is outside the first distance of origin point, refraining from adjusting the network status for the limited region based on the event. The method further includes, when the first node is within a second distance of the origin point, the second distance greater than the first distance, transmitting the notification of the event to neighboring nodes of the network. The method may further include refraining from transmitting the notification to neighbouring nodes when the first node is outside the second distance of the origin point. In various embodiments, the origin point of the event may be a location of the event, or a location of a node initially generating the notification of the event.

In some embodiments, transmitting the notification of the event to neighbouring nodes comprises transmitting the notification to one or more neighbouring nodes which are within the second distance of the origin point and refraining from transmitting the notification to one or more neighbouring nodes which are further than the second distance from the origin point.

In some embodiments, the node is determined to be within or outside of the first distance or the second distance of the origin point based on a hop counter or time to live counter communicated with the notification of the event. In some embodiments, one or both of the first distance and the second distance are physical distances determined based on a comparison of location of network nodes. In some embodiments, one or both of the first distance and the second distance are numbers of network hops between network nodes. In some embodiments, the node is determined to be within or outside of the first distance of the origin point, the second distance of the origin point, or both, based on one or more of: a hop counter communicated with the notification; a time to live counter communicated with the notification; and an indication of distance between the first node and the origin point which is determined based on information included in the first notification.

Embodiments of the present invention provide for an apparatus in a network and which is located at a first node of the network. The apparatus includes a network interface and processing electronics. The apparatus is configured to maintain a network status for a limited region of the network which is communicatively coupled to the first node. The network status includes availability of communication links between network nodes in the limited region. The apparatus is configured to receive a notification of an event corresponding to another node of the network or corresponding to a communication link of the network. The apparatus is configured, when the first node is within a first distance of an origin point of the event, to adjust the network status for the limited region based on the event, and when the first node is outside the first distance of the origin point, refrain from adjusting the network status for the limited region based on the event. The apparatus is configured, when the first node is within a second distance of the origin point, the second distance greater than the first distance, to transmit the notification of the event to neighboring nodes of the network. The apparatus may be configured to make determinations of whether the first node is within or outside the first distance and the second distance. The apparatus may be configured to operate in accordance with the method as already described above.

Embodiments of the present invention provide for a system comprising a plurality of network nodes. Each network node includes a network interface and processing electronics. Each network node is configured to operate as described above with respect to an apparatus.

Embodiments of the present invention provide for a method for supporting communication by a first node in a network. The method includes operations performed in response to detecting an event occurring proximate to the first node, the event corresponding to the first node, another node of the network, a communication link of the network. The operations include transmitting a notification of the event to one or more other nodes in the network, the notification including an indication of an origin point of the event, an indication of a first limited region surrounding the origin point, and an indication of a second limited region surrounding the origin point. Further nodes in receipt of the notification of the event are configured to process contents of the notification when located within the first limited region, and said further nodes in receipt of the notification of the event are configured to propagate the notification when located within the second limited region.

Embodiments of the present invention provide for an apparatus in a network. The apparatus is located at a first node in a network and includes a network interface and processing electronics. The apparatus is configured to perform operations in response to detecting an event occurring proximate to the first node, the event corresponding to the first node, another node of the network, a communication link of the network. The operations include transmitting a notification of the event to one or more other nodes in the network, the notification including an indication of an origin point of the event, an indication of a first limited region surrounding the origin point, and an indication of a second limited region surrounding the origin point. Further nodes in receipt of the notification of the event are configured to process contents of the notification when located within the first limited region, and said further nodes in receipt of the notification of the event are configured to propagate the notification when located within the second limited region.

Related embodiments of the present invention provide for a method involving multiple nodes of the network, where plural nodes perform operations commensurate with the above-described method.

Related embodiments of the present invention provide for an apparatus for supporting packet routing by a node in a network, the apparatus located at a node of the network, the apparatus comprising a network interface and processing electronics and configured to perform operations commensurate with the above-described method.

Related embodiments of the present invention provide for a system comprising multiple apparatuses forming a network, where one, some or all of the apparatuses are configured as described above.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2 schematically illustrates an example scenario involving two network nodes which are able to monitor each other, according to an embodiment of the present invention.

FIG. 3A schematically illustrates another example scenario involving two network nodes, one of which is not able to monitor the other, according to an embodiment of the present invention.

FIGS. 4A and 4B illustrate network node operations provided in accordance with an embodiment of the present invention.

It will be noted that throughout the appended drawings, like features are identified by like reference numerals.

DETAILED DESCRIPTION

Figure 1:
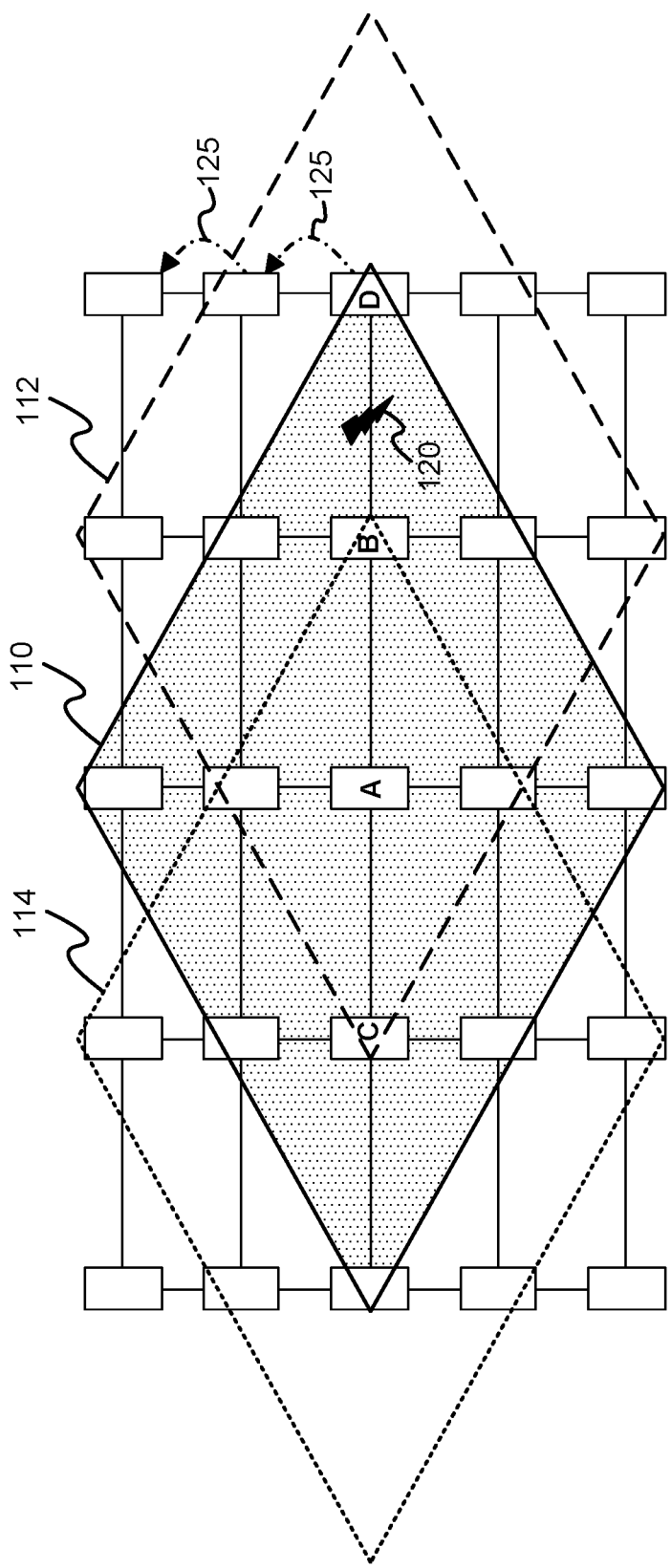
FIG. 1 illustrates a portion of a communication network including three nodes with associated limited flood regions, according to an embodiment of the present invention.

As used herein, the term "about" should be read as including variation from the nominal value, for example, a +/−10% variation from the nominal value. It is to be understood that such a variation is always included in a given value provided herein, whether or not it is specifically referred to.

Satellite-based networks potentially provide global connectivity and may also provide new coverage extensions in Fifth Generation (5G) communications technologies, as defined for example by the $3^{rd}$ Generation Partnership Project (3GPP). Overall industry interest is to deploy inter-satellite links to route user traffic over multiple satellites. In this regard, use of low earth orbits (LEO) satellite systems may be appropriate, as such systems have lower round trip latency and lower launch costs compared to Medium earth orbit (MEO) and Geostationary earth orbit (GEO) systems. However, an effective global network requires potentially large numbers of LEO satellites. On the other hand, the dynamic nature of satellite network constellations presents challenges for existing routing protocols due for example to the existence of an orbital seam e.g. in a polar constellation, or between multiple seams in a Walker Delta constellations, the size of network, and the requirement to timely communicate network changes to all nodes as they occur.

While GEO satellites are stationary to the side of the earth they are facing, MEO and LEO satellites are considered to be mobile with some time periodicity. That is, they meet the same point of the earth after a specific time period which is dependent on their altitude. GEO satellites are located at 22,236 miles (35,786 kilometers) above Earth's equator. Due to high altitude of these satellites and long round trip delay, GEO satellites are not a proper option for broadband, low delay data networks. LEO satellites however, provide global coverage over the earth and are capable of reusing frequency more effectively. LEO satellite networks can provide ubiquitous connectivity with low latency. A characteristic of these satellite networks is that many satellites are typically needed to provide global coverage, mainly due to the low altitude of the individual satellites.

In satellite communication technologies, a satellite constellation is defined as a group of satellites with coordinated ground coverage and shared control rotating in LEO orbits. Two main satellite constellations are "polar constellation" and "Walker Delta constellation". Walker Delta constellations are thought to provide better uniform coverage over the earth almost everywhere except poles, where no coverage is provided. Polar constellations however provide a dense coverage over the poles and less dense coverage over the equator.

Satellite network nodes may have two types of interfaces: Ground communication interfaces, and Inter-satellite link (ISL) communication interfaces. The ground communication interfaces can be microwave systems operating in X-band or ka-band. The ISL interfaces can use communication lasers and can provide for high-speed optical free-space communication links between the satellite nodes. ISL links include intra-orbit links, i.e. links between (typically adjacent) satellites in a common orbit but spaced apart, and inter-orbit links, i.e. links between satellites in different (typically adjacent) orbits.

Due to the dynamic nature of the satellite networks, the ISL characteristics also change dynamically. Even for ISLs where link distance is constant, the link behavior may change as the satellites pass over different parts of the earth (e.g. at the poles). The dynamic range of characteristics for the ISLs is significantly larger for inter-orbit ISLs for both polar and walker delta constellations. Due to the dynamically changing ISL links, the network topology in satellite networks is considered to change dynamically. The impact of network topology changes, link failures and link creations, link level optical impairments as well as Doppler Effect makes packet routing a significant challenge in satellite data networks. This is particularly the case in dense LEO satellite networks where network events are frequent. Packet addressing is another challenge. Additionally, satellite onboard processing capability is limited and therefore it is desirable to limit the amount of onboard processing that is required to perform functions such as network routing.

One issue in satellite networks relates to flooding behavior and integration with ground segments of the network. Internet protocol (IP) based routing does not scale well with very large flat satellite networks requiring minimum delay (distance) routing. This is due to the fact that the satellite network topology is dynamic and minimum distance paths change over time. Flooding is a mechanism by which network nodes, such as satellites, propagate notifications of a network event, such a link failure, to other network nodes. In particular, the network node initially detecting the network event notifies its neighbour nodes, which in turn may notify their neighbour nodes, and so on.

Link failures occur frequently in large scale massive satellite networks. In single-hop geographical routing with link failures, alternate path routing may take packets farther from their destination. This tends to lead to failure of single-hop geographical routing. This problem arises due to the fact that the entire region of the network may not be visible to each node. Since performing network status update messaging (e.g. via flooding) is time consuming, network convergence is relatively slow. When network status changes are frequent, this can result in network information at each node failing to adequately track the actual network state.

In networks involving mobile nodes, such as LEO satellite nodes, the relative motion of satellites with respect to each other, ground nodes, or both, can result in time-varying network topology and link availability. Maintaining routing tables and link state information globally therefore becomes a challenging task. It is therefore useful to consider alternative routing methods, which can be implemented using limited information. The limited information may include node location and link state information for only those nodes in a local neighbourhood of a given node making a routing decision.

For example, when using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it may be desirable to determine which target satellite is currently closest (or adequately close) to the ground destination so that the packet can be routed along a path toward that satellite.

Embodiments of the present invention provide for a method, apparatus and system for limited flooding of network status update messages, for example for use in supporting packet routing in a network. The network may be a hyper dynamic network, for example. Packet routing support can include packet routing, or at least maintaining of network status information that can be used for routing support. The network status information (also referred to as network status) can be maintained (kept up-to-date) using network status update messages (also referred to as notifications of events) communicated between network nodes, for example via flooding protocols. Network status update messages include information indicative of network events impacting network status, such as indications of node or link failures or recoveries. Packet routing includes determining a path through the network which the packet is to be forwarded along, and transmitting the packet to a node along that path, for example by forwarding it to the next hop node along the path.

Embodiments of the present invention address network routing challenges in the context of satellite networks. Specific focus is in the application to non-terrestrial massive (satellite) polar and Walker-Delta constellation networks in order to provide global communications services that may not be supported by terrestrial (e.g. wire line or fibre-based) networks. The networks are generally considered to be flat, i.e. non-hierarchical, without necessarily being separated into multiple routing areas. Various embodiments provide for a flat network routing paradigm in which each network node is only required to have limited knowledge of network conditions, for at least some portions of the network. This limits the requirement to propagate network condition updates (e.g. via flooding link status update messages) through the network. In particular, in various embodiments, network status update messages (e.g. in the form of link state advertisements) are communicated locally to a limited set of other nodes (e.g. defined based on the node generating the update initially). The network status updates may indicate availability of communication links between nodes. Network status update messages generated by some nodes in the network therefore do not necessarily reach other (e.g. far away) nodes of the network. This allows each node of one or more nodes to maintain network status information for a limited region of the network which is communicatively coupled to that node. It is noted that embodiments of the present invention are not necessarily limited to satellite networks. Embodiments can be applied to fixed or mobile terrestrial networks, or combination terrestrial and satellite networks.

By considering flat networks which are not separated into multiple routing areas, embodiments of the present invention allow for a relatively simple networking paradigm that considers a single routing area. This can be particularly important when implementing networks in which nodes are highly mobile, for example in the case of satellite networks.

The propagation of network status updates is limited. Restricting communication of network status update messages to a limited set of other nodes can be done in a variety of ways. In some embodiments, the network status update messages are propagated using a flooding protocol and the messages are configured to include a time to live (TTL) counter initially set to a predetermined value. The network status updates include notifications of events corresponding to nodes or links of the network. Events can include events which cause a node or link to become unavailable (e.g. link failures or planned outages) or events which cause a node or link to become available either for the first time or after a period of unavailability. Each network node which forwards the network status update message onward may adjust (e.g. decrement) the counter before forwarding. Each network node receiving the network status update message checks the current (or adjusted) value of the counter, forwards the network status update message onward if the value of the counter is above a predetermined threshold (e.g. zero) and discards the network status message without forwarding it otherwise. A hop counter which is incremented upon forwarding can be used as an alternative to a TTL counter which is decremented. Other approaches for restricting communication to a limited set of nodes are also possible. For example, the network status update message can include an indication of origin, which can be the network or physical location of the node generating the network status update message or the network or physical location of the network event which is the subject of the network status update message.

Nodes receiving the network status update message can selectively forward or discard the network status update message based on location. For example, a node can compare the indication of origin location to the node's own location, or to the location(s) of the node's neighbour(s). When the distance between the two locations is less than a predetermined threshold, the node can forward network status update message to one or more of its neighbours. Otherwise the network status update message can be discarded. When the distance between the two locations is less than another, smaller threshold, the node can also process the network status update message. For example, the node can forward the network status update message to all of its neighbours when the node falls within a certain distance of the update message's origin. As another example, the node can forward the network status update message to all of its neighbours (if any) which themselves fall within a certain distance of the update message's origin. For global or satellite networks, instead of distance, forwarding decisions can be made based on a combination of distance and latitude and longitude, or coordinates in another coordinate system (e.g. rectangular or polar coordinates). As another approach, network nodes can randomly forward or discard network status update messages. The randomization can optionally be based on a parameter which is carried with the network status update message and modified upon forwarding of the network status update message. Accordingly, based on physical or network location information, or based on hop count or TTL count, nodes can determine whether a network event is within a predetermined distance of the node itself, or within a predetermined distance of a prospective node toward which packets might be transmitted. Based on this determination, the notification of the network event (i.e. the network status update message) can be selectively forwarded (or not forwarded) to immediate neighbour nodes.

Notably, in embodiments of the present invention, a network node which forwards a network status update message does not necessarily also process the network status update message. Rather, some nodes may act as transit nodes to forward network status update messages without processing, in order to circumvent or compensate for network link or node failures.

Methods and apparatus for packet forwarding in networks with limited information as described above can be implemented. Potentially applicable methods are described for example in U.S. patent application Ser. Nos. 16/888,023 and 16/887,675, which are hereby incorporated herein by reference. Generally speaking, a network node retains network status information for a limited region, i.e. less than all, of a network. When the node is required to transmit or forward a packet to a destination outside of this limited region, it can select a target node within its limited region of the network that is "closer to" the destination and transmit the packet toward this target node. In some cases, the packet destination can be identified in part by its physical (e.g. geographic, spatial or spatio-temporal) location, and the physical locations of nodes within the limited region of the network can be tracked by the network node. In this case, the node can select the target node as a node which is physically closer to the destination, based on this physical location information. The node then forwards the packet toward the target node along a determined, typically multi-hop, network path. The determined network path typically lies fully within the limited region of the network as seen by the node. The process can be repeated by the target node upon receipt, by intermediate nodes between the node and the target node (upon receipt of the packet), or a combination thereof. According to this approach, routing is performed over portions of the network which the network node has full awareness for, even though no network node necessarily has full awareness for the entire network. In this manner, nodes restrict the routing of packets so that packets are routed only toward network nodes in a limited region, typically coinciding with a region for which the node maintains full network status information.

Geographic routing may be implemented in support of such packet forwarding. That is, the physical or network location of a packet's destination can be specified in such a manner that a node can determine which node(s), among those in its limited routing portion of the network, are relatively closer to the packet's destination. This can be performed even without having information regarding the status of the part of the network near the packet's destination. For example, the packet's destination can be specified using geographic coordinates, and each node can maintain an indication of geographic coordinates of all nodes in its own limited routing portion.

FIG. 1 illustrates a portion of a communication network including three Nodes A, B and C with respectively associated limited flood regions 110, 112, 114. A fourth Node D is also shown. A flood region corresponds to the portion of a network which is expected to receive a network status update message via flooding, given network node behaviour as a whole. This can be contrasted with the related concept of a monitored region, which is the portion of the network for which a node reliably receives network status update messages. The limited flood regions are established by causing Nodes A, B, C and D to generate network status update messages with a TTL counter initially set to two, and causing all nodes (other than the originating nodes) to decrement the TTL counter and forward the network status update message to all of its connected neighbours if the decremented TTL counter is greater than zero. As an example, when Node D detects a link failure 120, it transmits network status update messages, e.g. 125 to its immediate neighbours. These neighbours, upon receipt, will propagate the network status update messages as long as the TTL counter is greater than zero after being decremented, and the process repeats.

It has been recognized by the inventors that the same network status changes which typically trigger network status update messages (e.g. link failures or link connections) also potentially affects which nodes ultimately receive the network status update message. For example, Node A in FIG. 1 is typically within two hops of Node D and is therefore typically expected to receive network status update messages initiated by Node D. However, when the link failure 120 occurs, Node A is no longer within two hops of Node D. Therefore, without further measures being taken, Node A would no longer include Node D in its monitored region and would not receive network status updates from Node D. (In this example it is assumed, for simplicity, that Node B, immediately between Nodes D and A, does not generate its own network status update message in response to the link failure 120.) If the link between Nodes A and B were to fail, network status update messages from Node B would not be able to reach Node A. Such impediments to propagation of network status update messages can impact operation of the network. For example, Node A can not be certain to have full information for the portion of the network within two hops of itself, and hence routing errors can occur.

According to embodiments of the present invention, measures are taken to adjust network node behaviour to compensate for the above-mentioned impediments to the propagation of network status update messages. Such measures generally involve allowing network status update messages to propagate beyond the set of nodes which are the intended recipients of such messages. Nodes in a region surrounding this set of nodes act as transit nodes, by receiving network status update messages and forwarding them onward so that they directly or indirectly reach back to the set of intended recipient nodes. These transit nodes provide a means by which network status update messages can be propagated around network failure points. One potential benefit is that each network node can be made capable of monitoring network status for a fixed region, and thus can route packets within this fixed region.

In some embodiments, the network status update message propagation behaviour of network nodes is configured as follows. A given node, when receiving a network status update message, determines whether it (the given node) is within a first limited region centered on an origin point of the network status update message. If so the given node processes the network status update message. When the same given node determines that it (the given node) is within a second limited region centered on an origin point of the network status update message, the given node propagates the network status update message. The second limited region is larger than and contains the first limited region. (Accordingly, for definiteness, when the given node is within the first limited region of the origin point, it both processes and propagates the network status update message.) Therefore, when the given node is within a first distance of the network event (the subject of the network status update message), the network status for the node's monitored region is adjusted based on the event. That is, the network status maintained by the node is updated to reflect the event, for example by marking a node or link as available or unavailable, or as having a certain capacity, quality level, etc. When the given node is within a second, greater distance of the network event, the node transmits the notification of the network event onward to neighboring nodes (without necessarily processing the message). In some cases, the network node may forward the notification only to neighbouring nodes which are within the second distance of the network event. Distance can be measured based on actual physical distance (e.g. measured in meters). Distance can be measured based on a network distance metric, such as the number of hops between two nodes. Distance can be measured based on a cost function or other substantially arbitrary function that reflects physical or network-based distance between nodes.

When measuring distance as an actual, physical distance, the network status update message may contain sufficient information to allow a node in receipt of the message to identify the physical origin of the message, to be compared with the node's own location in order to determine distance. The network status update message may include an indication of the physical location of the node which created the message. The network status update message may include an identity of the node which created the message, and the node in receipt of the message may have access to information, such as a lookup table, that allows it to determine the physical location of the node which created the message based on the identity. It is noted that, when nodes are mobile, such as in the case of satellites, determining node location and corresponding distance travelled may not be straightforward. Alternatively to allowing for determining a precise physical distance, the network status update message may contain sufficient information to allow a node to determine whether the node which created the message is within or outside one or more threshold distances, such as $R_F$ and $R_{FTA}$ as described elsewhere herein.

An alternative, roughly equivalent specification which does not rely on the second limited region containing (i.e. including as part of itself) the first limited region is as follows. Consider a network status update message that has an origin point, and a node which receives the network status update message. When the node is within a first limited region centered on the origin point, the node receiving the network status update is configured to both process and propagate the network status update message. Consider another network status update message that has this origin point and another node which receives the network status update message. When the other node is outside of the first limited region centered on the origin point and within a second limited region centered on the origin point, the other node receiving the network status update is configured to propagate the network status update message without processing of the network status update message. In this case the second limited region might be viewed as a "ring" surrounding but not including the first limited region. Generally speaking, an origin point can be a node that initially generates and transmits a notification of an event, or else the origin point can be a location of the event which is the subject of a notification, such as a node or link that has changed its status (e.g. failed or recovered).

Figure 3B:
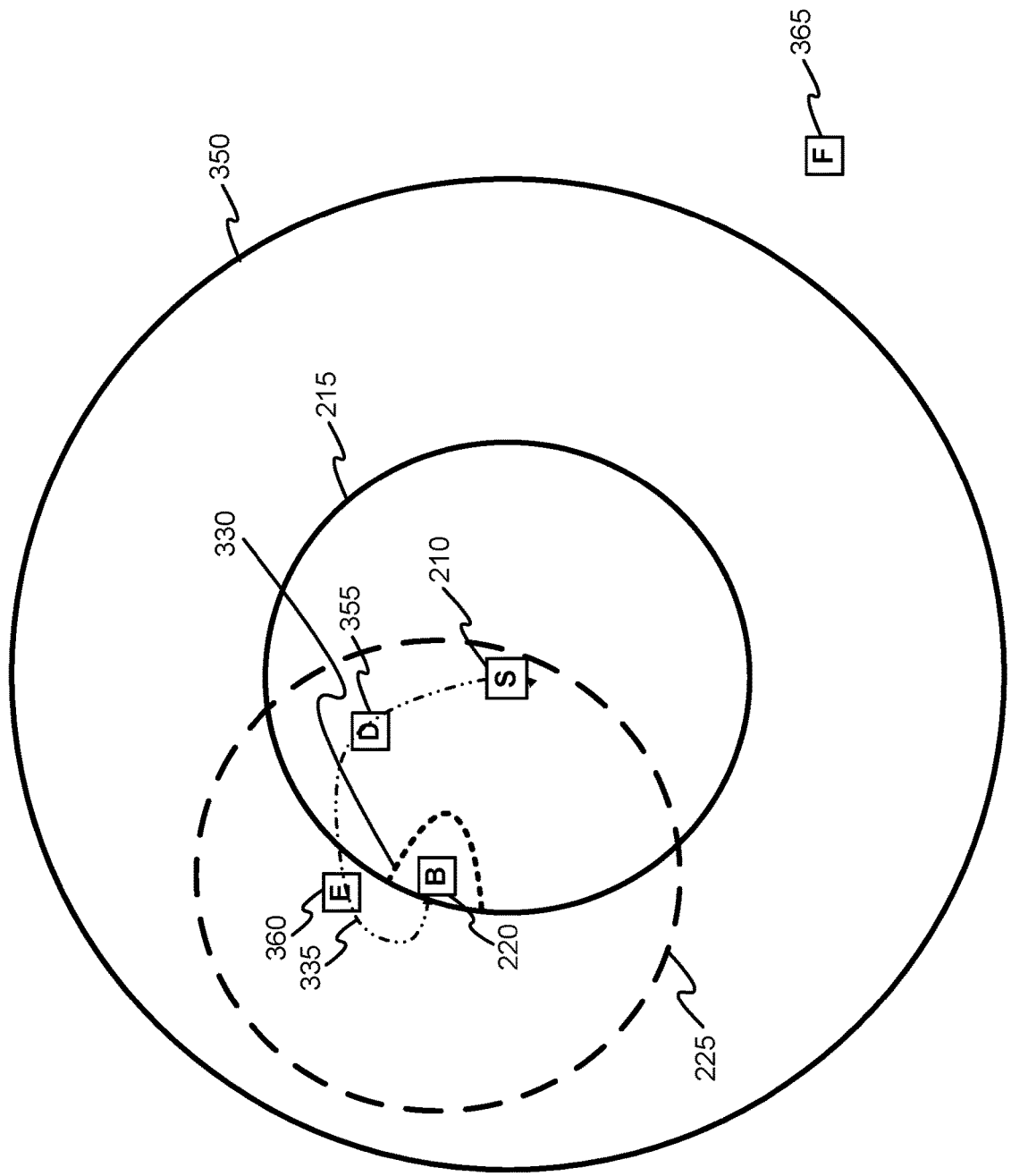
FIG. 3B illustrates an example scenario showing the propagation or non-propagation of network status update messages by various nodes, according to an embodiment of the present invention.

For example, referring to FIG. 3B, Node D 355 is within a first limited region 215 centered on a first origin point corresponding to Node S 210, and therefore Node D both processes and propagates network status update messages originating from Node S. Node E 360 is outside of the first limited region 215 and within the second limited region 350 (viewed as a ring formed around and excluding region 215), and therefore Node E propagates network status update messages originating from Node S without processing these network status update messages.

According to this behaviour, network status update messages are propagated to nodes which do not necessarily process them. These nodes can act as tandem nodes or transit nodes operating to forward the network status update messages along, with the desired effect that these network status update messages will be forwarded around network faults and back toward nodes which will process the network status update messages (e.g. Node B 220 in FIG. 3B). This allows network status update messages to be propagated further in order to make it more likely that a network node's monitored region, routing region, or both, remains the same even in the face of network failures. This tends to allow the network node's routing region to stay the same while also being matched to the network node's monitored region. Such embodiments allow network status update messages to be propagated within a limited region of the network beyond that required to support network nodes' monitored regions under ideal (non-fault) conditions. Therefore, when the network status changes, the extra propagation of network status update messages allows these same monitored regions to still be supported, and routing regions do not need to be adjusted to match reduced monitored regions.

FIG. 2 schematically illustrates a scenario involving a network Node S 210 and a network Node B 220. Also shown are a flood region 215 of the network which the network Node S 210 can reach with network status update messages (initiated by the first network node) and a flood region 225 of the network which the network Node B 220 can reach with network status update messages (initiated by the second network node). These flood regions 215, 225 correspond to the regions which are able to receive a network status update message, initiated by the network Nodes S and B, respectively, given the current network conditions and limits on flooding. The limits on flooding can correspond to a rule that causes network status update messages to be discarded after travelling a certain distance, for example based on hop count or TTL count. As illustrated, the network Node S 210 lies within the flood region 225 and the network Node B 220 lies within the flood region 215. This is illustrated by path 205 which is a path by which network status update messages can travel between the network Nodes S and B. Therefore, there is a certain level of symmetry and network events detected by each of the Nodes S and B can be expected to be communicated to the other one of the Nodes S and B.

FIG. 3A schematically illustrates an alternative scenario involving the network Node S 210 and the network Node B 220. In this case, the network Node S 210 lies within the flood region 225, as shown by path 322. However, due to network failures 330, network status update messages initiated by the network Node S 210 cannot reach the network Node B 220 by any path falling completely within the flood region 215. The only way for a network status update message to travel from the network Node S to the network Node B is via a path, e.g. 335, which falls partially outside of the flood region 215. (Path 322 would also be usable.) Therefore, without employing transit nodes, the network Node B 220 has a monitored region which excludes the network Node S 210. Put another way, without transit nodes, network status update messages from Node S 210 have no way to reach Node B 220 via a path lying completely within flood region 215. This is potentially problematic because network Node B 220 is unable to receive and respond to network status updates from network Node S 210, and thus errors can occur when transmitting data packets from Node B to Node S.

FIG. 3B illustrates an example scenario showing the propagation or non-propagation of network status update messages by various nodes, according to an embodiment of the present invention. The scenario of FIG. 3A is used for clarity. Node S 210 transmits a network status update message to neighbouring nodes, and it is desired that the network status update message is received by all nodes within the flood region 215. Node D 355 and Node E 360 are along a path 335 between Node S 210 and Node B 220. Node D and Node B are within the flood region 215, however Node B is not reachable from Node A via any path which is contained only within the flood region due to network failures 330, and path 335 extends outside of the flood region.

Node S 210 configures the flood message with an indication of its location, an indication of the flood region 215, and an indication of a transit region 350. Node D 355 receives the flood message and determines that it (Node D) is within the flood region. Node D therefore processes the contents of the network status update message, and also forwards the network status update onward to its neighbours, particularly neighbours which are within the flood region 215 or within the transit region 350. Node E 360 receives the flood message directly or indirectly from Node D and determines that it (Node E) is within the transit region but outside of the flood region. Node E therefore refrains from processing the contents of the network status update message, but forwards the network status update onward to its neighbours, particularly neighbours which are within the flood region 215 or within the transit region 350. One of these neighbours is Node B 220, or a node which is directly or indirectly communicatively coupled to Node B. Node B 220 thereby receives the flood message (directly or indirectly from Node E) and determines that it (Node B) is within the flood region. Node B therefore processes the contents of the network status update message. Node B may also forward the network status update onward to its neighbours, particularly neighbours which are within the flood region 215 or within the transit region 350, if any. As is typical with flooding, nodes may refrain from transmitting messages back toward nodes which they received the message from.

Node F 365 is outside of the flood region 215 and is not an intended recipient of the network status update message. Node F 365 is also outside of the transit region 350 and thus does not act as a transit node. Thus, even if Node F 365 were to receive the network status update message, Node F would discard the message without forwarding.

In various embodiments, a node which is inside the flood region can also be considered to be a node which is within a first distance of an event corresponding to a node or link which is at the center of the flood region. A node which is outside the flood region can also be considered to be a node which is greater than the first distance from the event. A node which is inside the transit region can also be considered to be a node which is within a second distance of the event, the second distance being greater than the first distance. A node which is outside the transit region can also be considered to be a node which is greater than the second distance from the event.

FIGS. 4A and 4B illustrate network node operations provided in accordance with an embodiment of the present invention, in order to mitigate the above problems. The operations are described, for simplicity, assuming that all nodes in the network (or at least within a portion of the network) operate in the same manner. However, it is considered that different network nodes can act differently while still falling within the scope of the present invention. The present invention provides for both a system of nodes (and associated method) collectively acting as described herein, as well as for an individual node (and associated method) acting as described herein.

It is assumed, for purposes of FIGS. 4A and 4B, that each node maintains information indicative of its own current location, the current locations of its immediate neighbours in the network, its flood propagation region or radius, denoted $R_F$, and its flood transmit allowance radius $R_{FTA}$. $R_F$ and $R_{FTA}$ can be expressed for example as a hop count, time-to-live count, geographic distance, orthodromic distance, or the like, or a combination thereof. $R_F$ generally represents the distance to which network status update messages are permitted to travel within the network before being discarded. $R_{FTA}$ is set so that it is greater than or equal to $R_F$. For example, $R_{FTA}$ can be set equal to $R_F*C$, for some predetermined parameter C greater than or equal to one.

According to FIG. 4A, a network Node S detects 405 a network event, such as a link failure or link establishment event. Upon detecting 405 the network event (which may be an event relating to a communication link terminating at the network node), the node creates 415 a network status update message indicative of the network event. The network status update message may include a location of the network node. The network status update message includes an indication of the flood propagation region or radius $R_F$. The network status update message further includes an indication of the flood transmit allowance region or radius $R_{FTA}$. In other embodiments, these values $R_F$ and $R_{FTA}$ are made known in other ways. For example the values can be preprogrammed into nodes. After creation 415 of the network status update message, the node transmits 420 the network status update message to all of its (reachable) immediate neighbours in the network.

According to FIG. 4B, a node receives 430 a network status update message, for example directly or indirectly from Node S. The node then determines 435 the distance between itself and Node S, for example based on its own prior information and potentially based on information within the network status update message. The node then determines 440 whether it is within the flood propagation region or radius $R_F$ of Node S. For greater clarity, the flood propagation region (and similarly the flood transit allowance region) may be considered to be substantially centered on Node S, in that the region is defined based on the location of Node S. If so, the node accepts and processes 445 the network status update message. This may include adjusting its local network topology in response to the network event communicated by the network status update message, updating routing rules and routing trees, etc. Concurrently, previously, or subsequently, the node may determine 450 whether it is within the flood transit allowance region or radius $R_{FTA}$ of Node S. In some embodiments, as illustrated, this determination is made upon determining that the node is outside of the flood propagation region or radius $R_F$ of Node S. If it is determined that the node is outside $R_{FTA}$ of Node S, an error condition 455 may be declared. This is because (due to processing rules to be described below), this condition should not occur. In other embodiments, the determination 450 may be omitted, and it may simply be assumed that the node is within the flood transit allowance region or radius $R_{FTA}$ of Node S. In some embodiments, if it is determined that the node is the node is outside $R_{FTA}$ of Node S, the network status update message is discarded.

For example, in some embodiments, the network status update message includes a hop counter or TTL counter which is updated each time the message is forwarded on. This counter can reflect distance travelled, which is compared to $R_F$, $R_{FTA}$, or both. The determination of whether or not to process, forward, or both process and forward the message can be based on a comparison of the counter to $R_F$, $R_{FTA}$, or both.

When the node is within the flood transit allowance region or radius $R_{FTA}$ of Node S, but outside of the flood propagation region or radius $R_F$ of Node S, it operates 460 as a transit node. According to transit node operation, the network status update message from Node S may be potentially forwarded, by the transit node, to neighbouring nodes. However, the transit node does not process the network status update message.

The node, acting either as a transit node or as a non-transit node, further operates to forward the network status update message to additional neighbour nodes, provided that suitable neighbour nodes exist. Accordingly, the node determines 465 the distance between Node S and its immediate neighbour nodes in the network (i.e. nodes directly connected to the node via a communication link). The node may exclude from this determination the prior node from which it received the network status update message, or otherwise inhibit forwarding of the network status update message back to this prior node. For neighbour nodes that lie 470 either within the flooding region or radius $R_F$, or the flood transit allowance region or radius $R_{FTA}$, the node forwards 475 the network status update message of Node S. Otherwise, the node refrains 480 from propagating the network status update message of Node S.

In other embodiments, the node may omit steps 465, 470 and 480 and, instead, unconditionally forward 475 all flood messages accepted at step 445 or 460 to all immediate neighbours regardless of location. In this case, the next nodes in receipt of the forwarded flood message will determined whether or not to process and propagate the flood message by a further iteration of the process illustrated in FIG. 4B (with or without steps 465, 470, 480). This alternative may be less efficient because network status update messages are propagated to nodes which might discard them without processing or forwarding.

The value(s) of $R_F$ $R_{FTA}$ and C may be configurable for each network node. Network operators may configure $R_F$ based for example on network (e.g. satellite constellation) size and density. The value(s) of $R_{FTA}$ can either be configured separately or set using the formula $R_F*C$. Generally speaking for networks with homogenous regions ($R_F$ set to be the same for all network nodes), it is considered that C=2 should be sufficient to provide for proper distribution of network status update messages between nodes. In some embodiments, for networks with heterogeneous regions (different values of $R_F$ for different nodes), $R_{FTA}$ for a node n can be set to $[R_{Fn}+\max(R_{Fi} \ldots R_{Fn})]$ where $\{i \ldots n\}$ represents the set of nodes whose regions intersect with node n's region, and $R_{Fi}$ is the value of $R_F$ for a given node i. Alternatively, to simplify configuration, in some embodiments, $R_{FTA}$ for heterogeneous networks can be set to $[\max(R_{Fi} \ldots R_{Fn})]*2$ where $\{i \ldots n\}$ represents the set of all nodes in the network.

Figure 5:
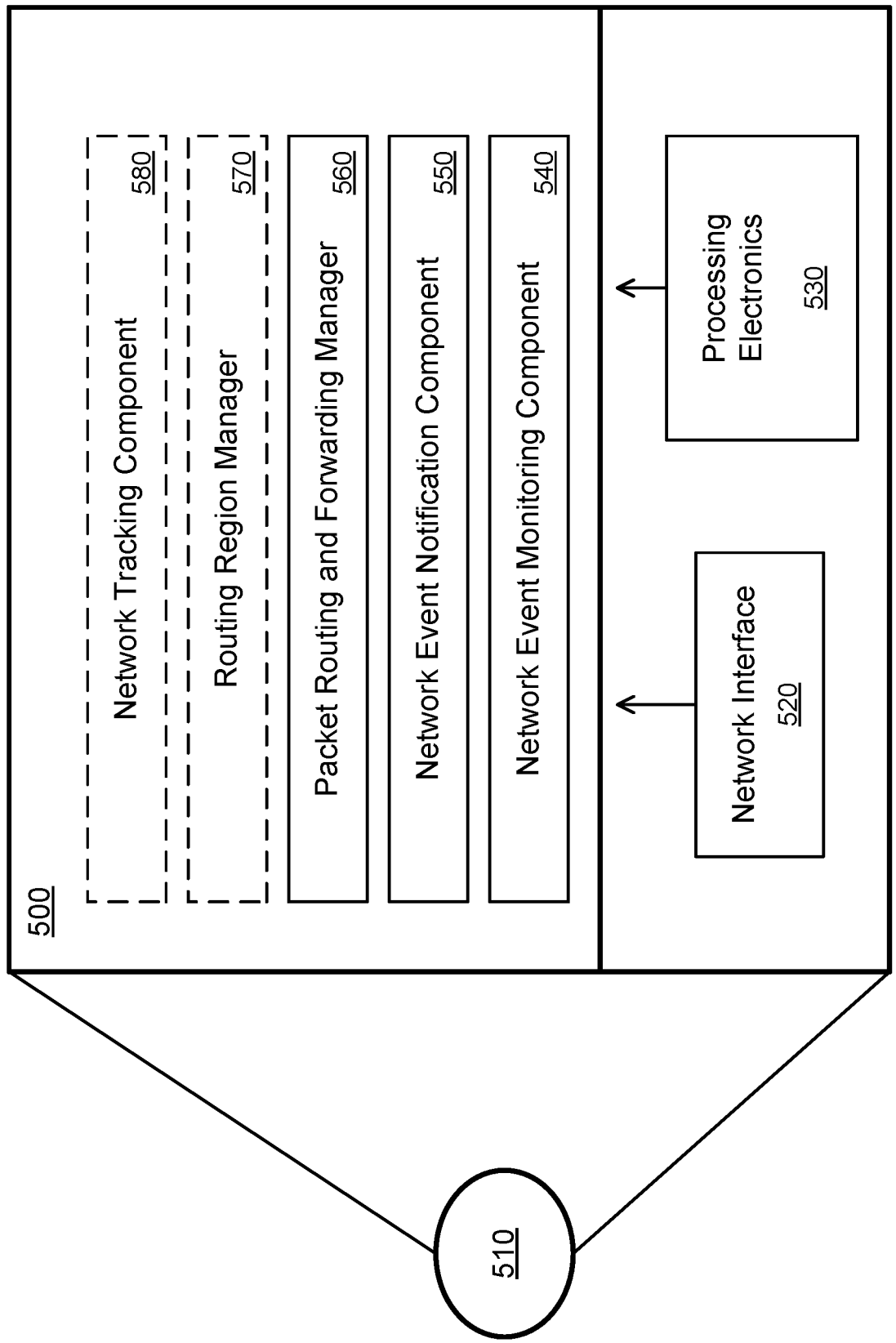
FIG. 5 illustrates an apparatus located in a network node, according to an embodiment of the present invention.

FIG. 5 illustrates an apparatus 500 located in a network node 510, according to an embodiment of the present invention. The apparatus 500 includes a network interface 520 and processing electronics 530. The network interface 520 can be a single network interface or a combination of network interfaces (e.g. including a satellite-to-satellite communication interface and a satellite-to-ground communication interface). The processing electronics can include components such as computer processors, memory, digital or analog circuits, or the like, or a combination thereof. The processing electronics 530 can be configured to provide the network event monitoring component 540, the network event notification component 550, and the packet routing and forwarding manager 560.

The network event monitoring component 540 is configured to monitor for network events, for example by monitoring for nearby link failures, nearby node failures, or messages received via the network interface 520 and indicative of network events such as node or link failures. The messages include network status update messages received from neighbouring nodes and indicative of network events. The network event monitoring component 540 can be configured to maintain network status for a limited region of the network. The network event monitoring component can be configured to determine whether or not to process network status update messages depending on their origin. For example, when the network status update indicates an event such that the node is within a first distance of the event, the network event monitoring component can be configured to process the event and provide the packet routing and forwarding manager with updated network information. Otherwise, the network event monitoring component can refrain from processing the event.

The network event notification component 550 is configured to generate messages indicative of network events, for transmission via the network interface, to other network nodes. The messages include network status update messages transmitted to neighbouring nodes. In various embodiments, the network event notification component can perform certain notification-related operations. The network event notification component can be configured to determine whether or not to forward network status update messages depending on their origin. For example, when the network status update indicates an event such that the node is within a second distance of the event (greater than the first distance), the network event notification component can be configured to forward the network status update onward to other nodes. Otherwise, the network event notification component can refrain from forwarding the network status update.

The packet routing and forwarding manager 560 is configured to manage packet routing and forwarding operations. For example, the packet routing and forwarding manager may maintain routing tables, routing trees, representations of network topologies, etc. The information maintained by the packet routing and forwarding manager may be based at least in part on notifications of network events received via the network event monitoring component 540. Packet handling behaviours can be performed based on the output of the packet routing and forwarding manager. The packet routing and forwarding manager can maintain routing information for the node's limited region of the network. This can be viewed as part of maintaining the network status. Then, other packets such as data packets can be handled and routed based on the maintained routing information. As noted above, packet routing can be restricted so that packets (other than network status updates) are only routed toward network nodes in the limited region, via links in the limited region. For example, when transmitting a packet toward a destination located outside of the limited region of the network, a target node within the limited region of the network is selected. The target node being relatively closer to the destination than the node, and once the target node receives the packet it can perform further routing.

The apparatus may further include a network tracking component 580 which is configured to track the location of the network node, the location of other network nodes, and related information regarding the network. This information can be used for routing purposes. The network tracking component can provide information to the packet routing and forwarding manager 560 for use in routing and forwarding packets.

Figure 6:
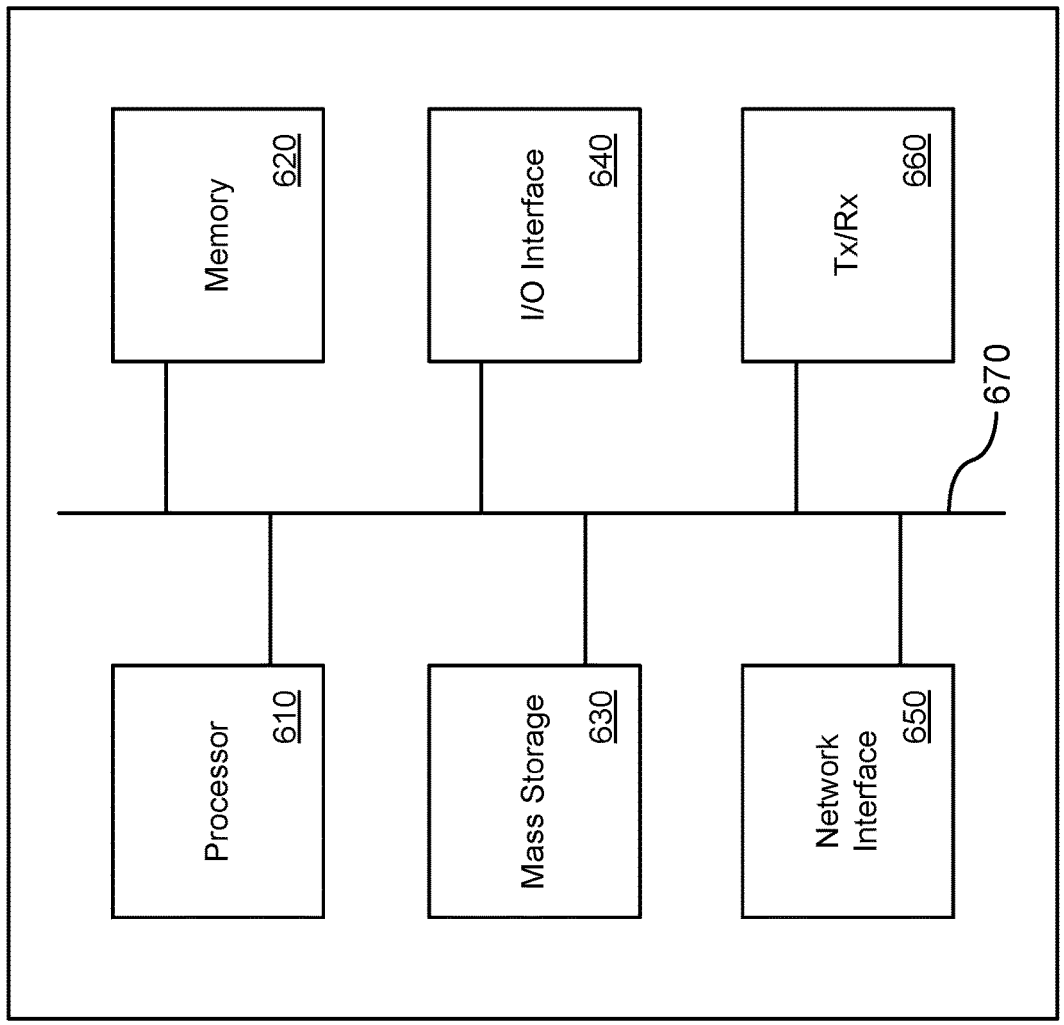
FIG. 6 is a schematic diagram of an electronic device that may perform any or all of operations of the above methods and features explicitly or implicitly described herein, according to different embodiments of the present invention.

FIG. 6 is a schematic diagram of an electronic device 600 that may perform any or all of operations of the above methods and features explicitly or implicitly described herein, according to different embodiments of the present invention. For example, a computer equipped with network function may be configured as electronic device 600.

As shown, the device includes a processor 610, such as a Central Processing Unit (CPU) or specialized processors such as a Graphics Processing Unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for supporting communication by a first node in a network, the method comprising:
   maintaining a network status for a limited region of the network which is communicatively coupled to the first node, the network status including availability of communication links between network nodes in the limited region;
   receiving a notification of an event corresponding to another node of the network or corresponding to a communication link of the network;
   when the first node is within a first distance of an origin point of the event, adjusting the network status for the limited region based on the event, and when the first node is outside the first distance of origin point, refraining from adjusting the network status for the limited region based on the event; and
   when the first node is within a second distance of the origin point, the second distance greater than the first distance, transmitting the notification of the event to neighboring nodes of the network.

2. The method of claim 1, wherein transmitting the notification of the event to neighbouring nodes comprises transmitting the notification to one or more neighbouring nodes which are within the second distance of the origin point and refraining from transmitting the notification to one or more neighbouring nodes which are further than the second distance from the origin point.

3. The method of claim 1, wherein the node is determined to be within or outside of the first distance or the second distance of the origin point based on a hop counter or time to live counter communicated with the notification of the event.

4. The method of claim 1, wherein maintaining the network status comprises maintaining routing information for the limited region of the network.

5. The method of claim 1, further comprising restricting routing of packets only toward ones of said network nodes in the limited region and only via ones of said communication links in the limited region.

6. The method of claim 5, wherein said restricting routing of packets comprises, when transmitting a packet toward a destination located outside of the limited region of the network, selecting a target node within the limited region of the network, said target node being relatively closer to the destination than the first node.

7. The method of claim 1, wherein one or both of the first distance and the second distance are physical distances determined based on a comparison of location of network nodes.

8. The method of claim 1, wherein one or both of the first distance and the second distance are numbers of network hops between network nodes.

9. The method of claim 1, wherein the node is determined to be within or outside of the first distance of the origin point, the second distance of the origin point, or both, based on one or more of: a hop counter communicated with the notification; a time to live counter communicated with the notification; and an indication of distance between the first node and the origin point which is determined based on information included in the first notification.

10. The method of claim 1, wherein the origin point of the event is a location of the event, or a location of a node initially generating the notification of the event.

11. An apparatus in a network, the apparatus located at a first node of the network, the apparatus comprising a network interface and processing electronics and configured to:
  maintain a network status for a limited region of the network which is communicatively coupled to the first node, the network status including availability of communication links between network nodes in the limited region;
  receive a notification of an event corresponding to another node of the network or corresponding to a communication link of the network;
  when the first node is within a first distance of an origin point of the event, adjust the network status for the limited region based on the event, and when the first node is outside the first distance of the origin point, refrain from adjusting the network status for the limited region based on the event; and
  when the first node is within a second distance of the origin point, the second distance greater than the first distance, transmit the notification of the event to neighboring nodes of the network.

12. The apparatus of claim 11, wherein transmitting the notification of the event to neighbouring nodes comprises transmitting the notification to one or more neighbouring nodes which are within the second distance of the origin point and refraining from transmitting the notification to one or more neighbouring nodes which are further than the second distance from the origin point.

13. The apparatus of claim 11, wherein the first node is determined to be within or outside of the first distance or the second distance of the origin point based on a hop counter or time to live counter communicated with the notification of the event.

14. The apparatus of claim 11, wherein maintaining the network status comprises maintaining routing information for the limited region of the network.

15. The apparatus of claim 11, further configured to restrict routing of packets only toward ones of said network nodes in the limited region and only via ones of said communication links in the limited region.

16. The apparatus of claim 15, wherein said restricting routing of packets comprises, when transmitting a packet toward a destination located outside of the limited region of the network, selecting a target node within the limited region of the network, said target node being relatively closer to the destination than the first node.

17. The apparatus of claim 11, wherein one or both of the first distance and the second distance are physical distances determined based on a comparison of location of network nodes.

18. The apparatus of claim 11, wherein one or both of the first distance and the second distance are numbers of network hops between network nodes.

19. The apparatus of claim 11, wherein the first node is determined to be within or outside of the first distance of the origin point, the second distance of the origin point, or both, based on one or more of: a hop counter communicated with the notification; a time to live counter communicated with the notification; and an indication of distance between the first node and the event which is determined based on information included in the first notification.

20. A system comprising a plurality of network nodes, each network node comprising a network interface and processing electronics and configured to:
  maintain a network status for a limited region of the network which is communicatively coupled to the network node, the network status including availability of communication links between network nodes in the limited region;
  receive a notification of an event corresponding to another node of the network or corresponding to a communication link of the network;
  when the network node is within a first distance of an origin point for the event, adjust the network status for the limited region based on the event; and
  when the network node is within a second distance of the origin point, the second distance greater than the first distance, transmit the notification of the event to neighboring nodes of the network and refraining from adjusting the network status for the limited region based on the event.

* * * * *